United States Patent [19]
Hsu

[11] Patent Number: 6,104,721
[45] Date of Patent: Aug. 15, 2000

[54] DSP BASED DYNAMIC RESOURCE ALLOCATION MULTIPROCESSOR COMMUNICATIONS BOARD

[75] Inventor: Teng Tai Hsu, Fremont, Calif.

[73] Assignee: Symmetry Communcations System, Santa Clara, Calif.

[21] Appl. No.: 08/982,740

[22] Filed: Dec. 2, 1997

[51] Int. Cl.[7] .................................................. H04L 12/28
[52] U.S. Cl. .......................................... 370/431; 364/131
[58] Field of Search ..................................... 370/431, 342, 370/345, 352, 353, 354, 359, 360, 367, 382, 383, 542; 6/396, 402, 404, 406, 411, 412, 413, 419, 428, 442, 536, 537, 540; 364/131, 133, 134, 138, 136, 140.01

[56] References Cited

U.S. PATENT DOCUMENTS

| | | | |
|---|---|---|---|
| 5,590,345 | 12/1996 | Barker et al. | 712/11 |
| 5,598,408 | 1/1997 | Nickolls et al. | 370/351 |
| 5,835,925 | 11/1998 | Kessler et al. | 711/2 |

*Primary Examiner*—Dang Ton
*Assistant Examiner*—Phirin Sam
*Attorney, Agent, or Firm*—Claude A. S. Hamrick; Oppenheimer, Wolff & Donnelly

[57] ABSTRACT

DSP based dynamic resource allocation multiprocessor communications boards may be used in either a circuit-switched data system or a packet switched data system including a plurality of channels for transmitting bit streams including service data packets and corresponding call setup requests indicative of a required amount of digital signal processing for the corresponding service data packets. For use in the circuit-switched data system, a dual port memory pool is partitioned into a plurality of memory sections each partitioned into memory portions including an input portion and an output portion. Each memory portion is accessible via first port and a second port. A distributing function unit provides multiplexed/demultiplexed paths between the channels and the memory sections. A processing bank includes a plurality of digital signal processors selectively connectable in series via serial ports to selectively operate in a plurality of modes including pipeline modes. A resource controller is coupled to the distributing function unit and to the processing bank. The controller implements resource control functions for dynamically allocating resources of the processing bank based on the required amounts of digital signal processing indicated by the call setup requests. The controller provides control signals to the processing bank to select at least one processor for processing tasks related to each call setup request and to selectively enable the serial ports to selectively provide pipeline processing between the processors.

27 Claims, 8 Drawing Sheets

DSP BASED DYNAMIC RESOURCE ALLOCATION MULTIPROCESSOR COMMUNICATIONS BOARD

FIELD OF THE INVENTION

The present invention pertains to a communications circuit for use in a data system providing communication services between an information handling center and multiple equipped user terminals. Specifically, the present invention relates to a method and apparatus for dynamically allocating communications processing resources used to process tasks specified by call setup requests.

DESCRIPTION OF THE PRIOR ART

Modern telecommunications systems, such as telephone systems and networks, are required to perform processing intensive communications functions including, for example, digital modulation, data coding, and modem functions. Such systems commonly employ at least one digital signal processor (DSP) having an architecture and instruction set suitable for real time digital signal processing applications.

Telecommunications systems employ multi-channel configurations which are integrated and implemented on a single communications board in order to reduce cost and enhance performance of the system. In multi-channel applications, the processing performance capability, or processing power, of a single DSP is often insufficient to process the mass amounts of data received from the multiple channels. In such cases, more than one DSP may be employed to process the overall data stream. In addition to processing intensive multi-channel applications, there are also single channel applications which require processing of extremely complicated algorithms and for which it is desirable to employ more than one DSP. Although semiconductor vendors have responded to the need for more powerful DSP chips, more sophisticated algorithms spawned by new applications continue to demand an increasing amount of processing power.

Important considerations in the selection of DSP chips for multi-channel applications include processing capability and power consumption. With regard to processing capability, the number of DSP chips required for a communications board may be determined based on the processing power required for processing one channel data stream and the total number of channels which require simultaneous processing. For example, a communications board may be designed to provide processing performance adequate for use in a T1 circuit, or T1 link. A T1 link typically includes 24 T1 type channels each having a bit stream speed of 64 Kbps. If the communications board uses several DSP chips each of which provides processing performance sufficient for handling one T1 channel, then the communications board would require a total of 24 DSP chips. The number of DSP chips required for a multi-channel application is approximately equal to the number of channels on the T1 link. The appropriate type of DSP chip to use for a communications board depends on the number of DSP chips required for the board, the heat generated by each, and the system limitations for thermal management.

As new communications services continue to emerge, the processing performance capabilities of DSP chips are increasingly challenged. One reason for this is that as more diverse services become available to end users of existing communications systems, the difference in the amount of use of different channels of a single link tends to increase, thereby creating a difference in the amount of processing power required for each channel again challenging the processing capabilities of individual DSP chips. For example, a wireless data service provider may offer basic services and extended services to an end user. The basic service may, for example, provide a capacity of 4.8 Kbps, 9.6 Kbps, or 14.4 Kbps for an end user. A full service may provide the basic service plus capacity for facsimile transmission which requires capacity for processing hand shaking signals. However, even if many end users concurrently using a communication system have full service capability, typically only a fraction of those users will simultaneously require the full extent of full service.

When new hardware is required to satisfy the demands of new applications, upgrading costs and delays are usually incurred. One approach to minimizing this upgrading problem is to initially include a DSP chip having a surplus of processing power to try to extend the hardware lifetime of the communications board. However, the system cost may be prohibitively increased by providing an initial surplus of unused processing power. Furthermore, this approach ignores the problem of the difference in the amount of use of different channels of a single link due to different types of services. Another approach to minimizing the upgrading problem is to provide different types of DSP chips with different processing power on the same board to accommodate the difference in the amount of processing required for the different channels of the single link. However, the use of different types of DSP chips on a single board leads to complex hardware and software maintenance issues.

What is needed is a DSP-based multiprocessor communications board which provides flexibility in order to extend the hardware lifetime while meeting the challenges of varying requirements for future communications applications.

SUMMARY OF THE INVENTION

It is an object of the present invention to provide a communications circuit for use in a communication data system wherein the circuit includes multiple digital signal processors and a controller for dynamically allocating resources of the processors based on required amounts of digital signal processing for different services.

Briefly, a communications circuit according to the present invention is used in a data system providing communication services between system nodes including an information handling center and multiple equipped user terminals. The system includes a plurality of communication lines each having a plurality of channels for transmitting bit streams including service data packets and corresponding call setup requests indicative of a required amount of digital signal processing for the corresponding service data packets.

The communications circuit includes a dual port memory pool. A distributing function unit is coupled for bi-directional communication with the system nodes via the channels. A processing bank includes a plurality of digital signal processors selectively connectable in series via serial ports to selectively operate in a plurality of modes including pipeline modes. A bi-directional data bus means is provided for communicating data between each of the processors and the memory pool and for communicating data between the distributing function unit and the memory pool. An address bus means is provided for communicating address information between each of the processors and the memory pool and for communicating address information between the distributing function unit and the memory pool. The distributing function unit provides multiplexed/demultiplexed data paths between the channels and the memory pool. A plurality of local memory units, each connected to a corresponding one of the processors, is provided. Each memory unit stores a set of operational codes defining modules for operating the corresponding processor.

A resource controller, coupled to the distributing function unit and to the processing bank, implements resource control functions according to the present invention, for dynamically allocating resources of the processing bank. The functions include: controlling the distributing function unit based on the call setup requests to control the multiplexed/demultiplexed paths between the channels and the memory pool; selecting from the processors, based on the call setup requests, for processing the tasks; and selecting the serial ports, based on the call setup requests, to selectively provide pipeline processing between the processors for processing the tasks.

The resource controller includes a mapping resource control (MRC) table for managing dynamic allocation of resources of each of the processors of the processing bank. The MRC table includes: a channel assignment status field for storing data indicating which of the call setup requests are assigned to the processors of the processing bank; a call setup information field for storing call setup information corresponding to each of the call setup requests; a service definition field for storing data indicating all service types currently supported by operational codes of the processors of the processing bank; and a processing bank resource status field for storing updated information regarding the availability of each of the processors for processing tasks.

A local resource control table is implemented by each set of operational codes, for managing operations of the corresponding processor. Each local resource control table provides mapping among modules of the set of operational codes and the call setup requests assigned to the corresponding processor. The local resource control table includes a service type field, a service definition field, a module functions field, and a resource usage status field.

The resource controller activates the modules of the operational codes based on the call setup requests by pointing to a position on the local resource control table. Upon determining that the processing performance of a single one of the processors is sufficient to process the required amount of digital signal processing indicated by the call setup request, the resource controller selects a single processor from the processing bank. Upon determining that the processing power of one of the processors is insufficient to meet the required amount of digital signal processing indicated by the call setup request, the resource controller selects at least two of the processors and forms a pipeline processing combination by enabling at least one of the serial ports to couple the at least two selected processors in series.

A first embodiment of the communications circuit is designed for use in a circuit-switched data system in which the bit stream speed is substantially equal for each of the channels. In this embodiment, the memory pool is partitioned into discrete memory sections respectively corresponding to the processors. Each of the memory sections is partitioned into memory portions including an input portion and an output portion.

A second embodiment of the communications circuit is designed for use in a paceket-switched data system in which frame relay is used as an underlying protocol, wherein the channels are described in terms of virtual circuits and the corresponding call setup requests include channel setup information specifying an amount of memory required for each virtual circuit. In this embodiment, resource control functions provided by the resource controller further include: generating address parameters, based on the channel setup information to define the particular memory sections in the memory pool; and providing the address parameters to the distributing function unit and to the local memory units.

A communications circuit providing dynamic allocation of processing resources according to the present invention provides flexibility in order to extend the hardware lifetime of the circuit while meeting the challenges of increasing processing power requirements of new data services. Also, the communications circuit provides efficient management of processing resources while avoiding fragmentation of the memory pool.

The foregoing and other objects, features, and advantages of the invention will be apparent from the following detailed description of the preferred embodiment which makes reference to the several figures of the drawing.

IN THE DRAWING

DETAILED DESCRIPTION OF THE PREFERRED EMBODIMENTS

Figure 1:
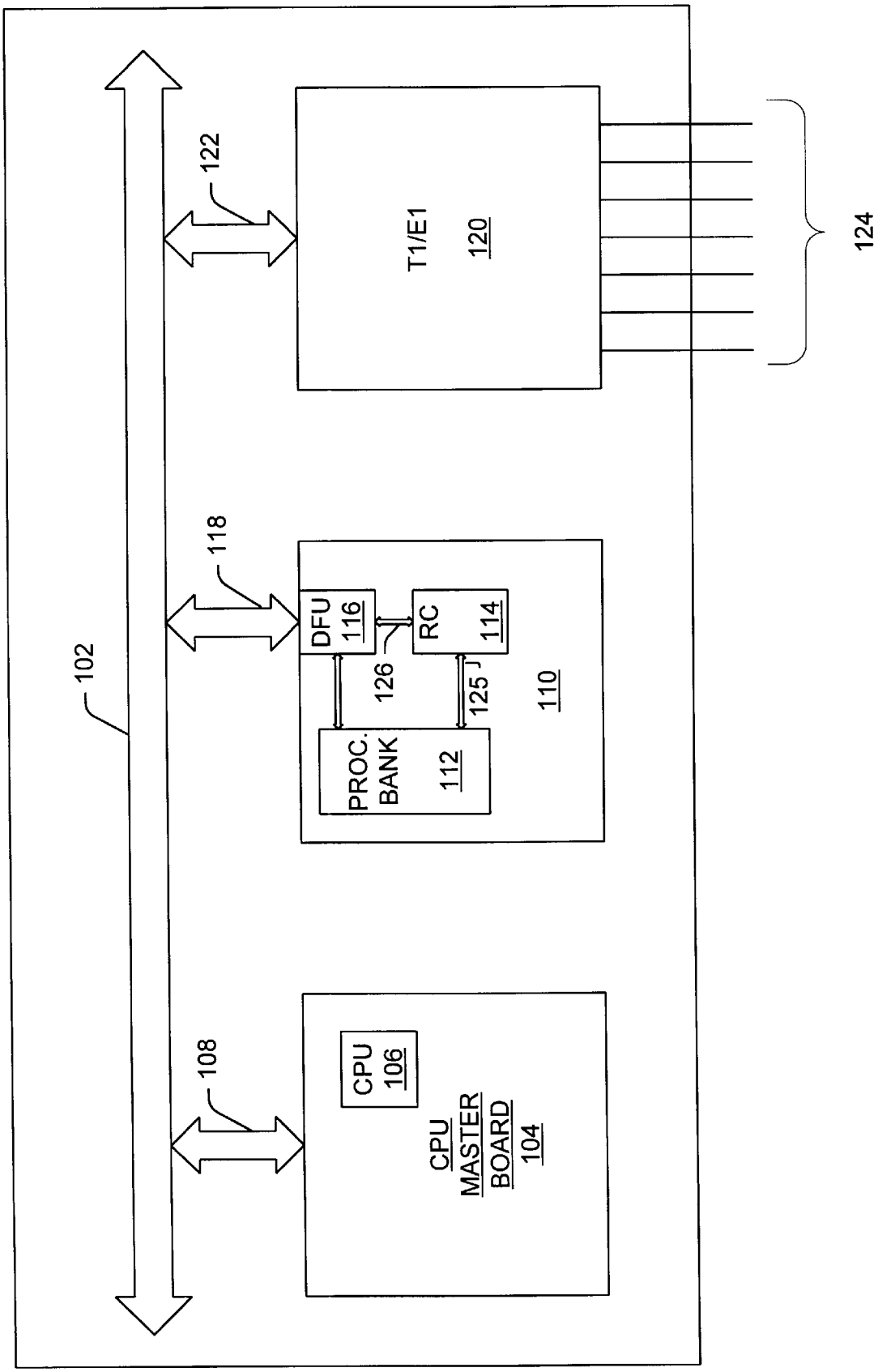
FIG. 1 is a generalized block diagram of a communications circuit for use in providing communication information services to multiple equipped user terminals.

FIG. 1 is a block diagram of a communications system for use in a data system providing communication services between data system nodes including an information handling center and multiple equipped user terminals. The system includes a plurality of communication lines each having a plurality of channels for transmitting bit streams including service data packets and corresponding call setup requests. The data system may be of a type for providing communication information services via the public switched network. The communications system may be used, for example, at a central office of an internet service provider (ISP) or at a server site.

The depicted communications system is designed for use in a circuit-switched data system in which the bit stream speed is substantially equal for each of the channels. The communications system includes: a back plane 102; a CPU master board 104 having a CPU 106 connected to back plane 102 via a control bus 108; a communications board 110 having a digital signal processing bank (processing bank) 112, a resource controller 114 for managing dynamic allocation of processing resources of the processing bank, and a distributing function unit (DFU) 116 connected to the back plane via a communication I/O bus 118; and a line card 120 connected to the back plane via a line bus 122.

CPU 106 of CPU master board 104 provides master control functions of the communications system including: controlling and coordinating functions of system boards including communications board 110 and line card 120; managing resources of each board; responding to external events and interrupts to take proper actions; monitoring the status, performance, and error conditions on each board; and managing the operation, administration, and maintenance issues of the communications system.

Line card 120 is coupled to a plurality of communication lines 124 each supporting multiple channels of bit streams. Line card 120 may be of a type designed to receive T1 or E1 type communication lines. In one embodiment of the present invention, the line card is adapted to receive a plurality of T1 lines, each including 24 channels which may operate at 64 Kbps. In another embodiment, the line card is adapted to receive a plurality of E1 lines, each including 32 channels which may operate at 64 Kbps. Service data packets are provided to line card 120 via different types of channel coding schemes depending on the services being implemented. End users, using multiple equipped terminals, may require services including facsimile transmission (FAX), compressed data transmission, modem service, paging, and video all of which may require data to be transmitted at various bit stream speeds such as, for example, 4.8 Kbps, 9.6 Kbps, and 14.4 Kbps. Voice and data typically occupy a bit stream speed of 64 Kbps on a T1/E1 facility. FAX, modem service, and other services are initiated using hand shaking procedures which require transmission of hand shaking messages between the depicted communications circuit and the end users.

The service data packets of the incoming bit stream, received by line card 120, are provided to CPU 106 of the CPU master board via back plane 102 and a bus 108. The service data packets include header sections which contain protocol information including call setup requests from the end users. Upon receiving call setup requests for a service requiring hand shaking procedures, CPU 106 executes instructions to implement the hand shaking procedures to set up the call. The call setup requests also include information indicative of an amount of digital signal processing power required for the corresponding service data packets.

Processing bank 112 includes a plurality of digital signal processors for processing the service data packets of the incoming bit stream. DFU 116 of communications board 110 provides multiplexed/demultiplexed paths for the service data packets transmitted and received between line card 120 and processing bank 112 as described further below. Resource controller 114 is connected to processing bank 112 via a control bus 125 and to DFU 116 via a bus 126.

In general, a communications circuit according to the present invention provides resource control functions for dynamically allocating resources of the processing bank 112 of board 110 based on the required amounts of digital signal processing indicated by the call setup requests. In the depicted embodiment of the present invention, the resource control functions are implemented by resource controller 114 of board 110. Controller 114 may be implemented by a microprocessor or by a DSP chip. In an alternative embodiment of the present invention, the resource control functions are implemented by CPU 106 of CPU master board 104.

In the preferred embodiment, resource controller 114 receives the call setup requests from CPU 106 via back plane 102, bus 118, DFU 116, and bus 126. From the call setup request, resource controller 114 extracts the processing power requirement indicative of the amount of digital signal processing required for service data packets corresponding to the call setup request. Here, resource controller 114 is essentially performing protocol end checking which includes reading data header sections. Upon determining the type of service specified and the processing power required to process tasks required by the call setup request, resource controller 114 implements functions including: (1) determining whether the processing performance of a single processor is adequate for processing the tasks specified by the call setup request; (2) reading updated processing bank status information from a table, further described below, to determine whether processors of processing bank 112 are currently available to satisfy the call setup request; and (3) transmitting control signals to processing bank 112 via control bus 125 to select one or more processors of the processing bank 112 to process the tasks. Each of the processors of processing bank 112 have an equal chance to be selected by the resource controller to process tasks for different service calls.

Resource controller 114 provides dynamic allocation of the digital signal processing resources of processing bank 112 in accordance with principles of the present invention. The status of each processor in processing bank 112 is monitored closely by resource controller 114 which manages the processing resources properly to avoid resource fragmentation while maximizing the efficiency. Resource controller 114 provides resource control function signals to DFU 116 for routing channels from the line card 120 to processing bank 112 as explained further below.

Figure 2:
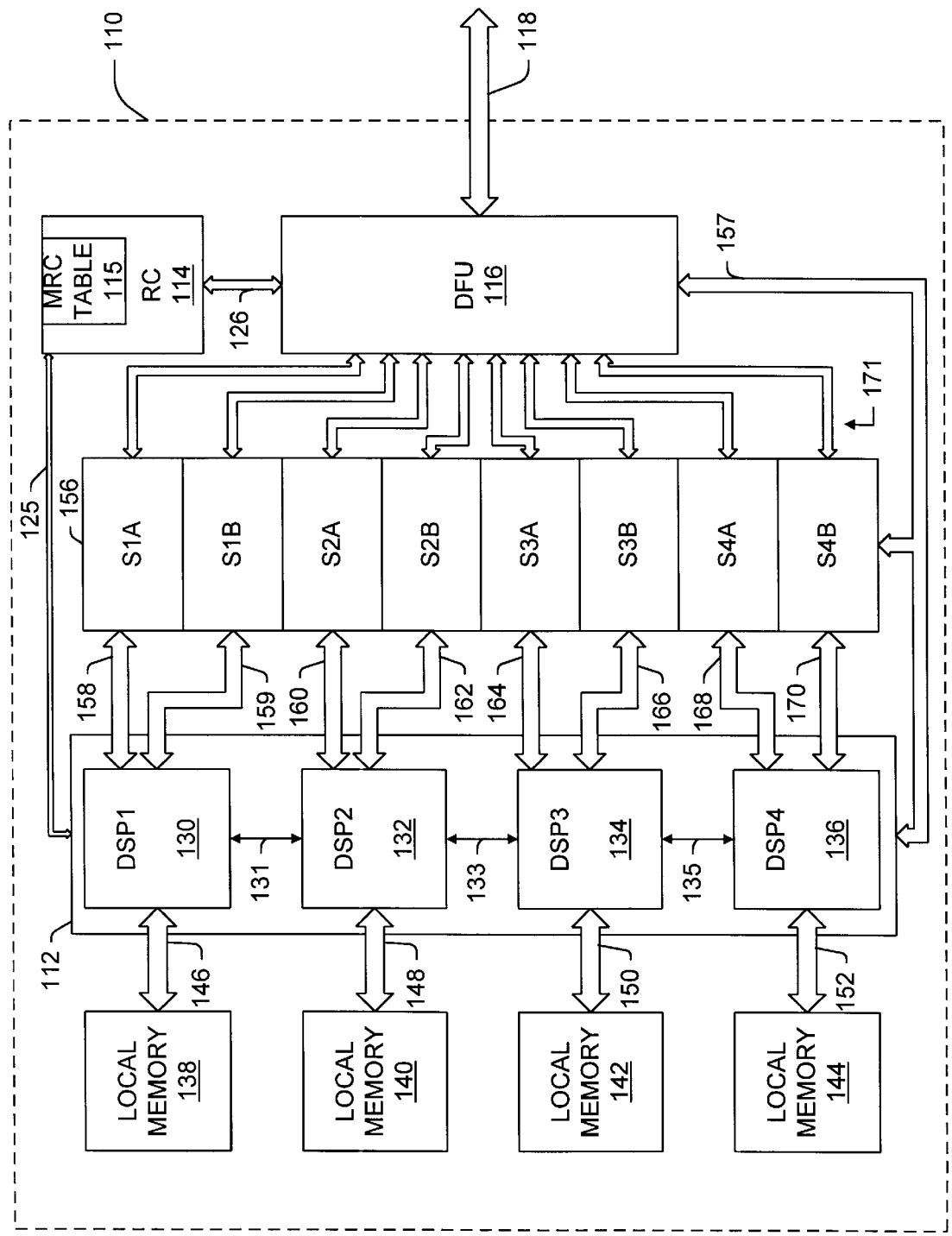
FIG. 2 is a detailed block diagram of an embodiment of a communications board included in the circuit of FIG. 1 according to the present invention for use in a circuit-switched data service in which the bit stream speed is approximately equal for a multiplicity of channels.

FIG. 2 is a detailed block diagram of an embodiment of the communications board 110 (FIG. 1) for use in a circuit-switched data service in which the bit stream speed is substantially equal for each channel of each of the communication lines 124 (FIG. 1). For example, the depicted board is suitable for use in the Global System for Mobile Communications (GSM) system for which the bit stream speed of each channel of each of the communications lines is 64 Kbps.

Communications boards providing dynamic allocation of processing resources according to the present invention include a processing bank having a number, N, of processors, a local memory space for each processor in the processing bank, and a shared input/output memory pool which, in the preferred embodiment, is accessible to each processor in the processing bank.

Resource controller 114 includes a mapping resource control (MRC) table 115 for managing processing resources of processing bank 112. As further explained below, the MRC table includes fields for storing data representative of: current assignments of processing resources to channels;

service call setup information, service definitions; and the usage status of each processor of the processing bank. In a preferred embodiment of the present invention, the resource controller is implemented by RCF software instructions executed over a microprocessor. The RCF software implements the MRC table and may be altered to customize RCF functions for new services and systems.

The depicted communications board 110 includes a processing bank 112 having four processors 130, 132, 134, 136 coupled in series via serial ports 131, 133, 135 to selectively provide pipeline processing capability in addition to distributive processing capability. Serial port 131 provides selective coupling between processors 130 and 132, serial port 133 provides selective coupling between processors 132 and 134, and serial port 135 provides selective coupling between processors 134 and 136. Serial ports 131, 133, and 135 are hardwired and are dynamically selected in response to control signals transmitted from resource controller 114 to the processing bank via control bus 125.

In the illustrated preferred embodiment, a local memory space is dedicated for communication with each of the processors of the processing bank. The depicted communication board includes four local memory spaces 138, 140, 142, 144 respectively coupled for bi-directional communication with corresponding processors 130, 132, 134, 136 via local memory buses 146, 148, 150, 152. Each of local memory spaces 138, 140, 142, 144 stores DSP operational codes, as explained further below, for operating the corresponding processor. Each of the processors is loaded with the same revision of the DSP operational codes. In a preferred embodiment of the present invention, the size of each local memory space is ample to allow for future expansion of the DSP operational codes. A variety of commercially available processors may be used to realize this goal. For example, the T1 TMS320C548 processor can address up to an 8-M word program space, which is sufficient for controlling ample local memory space for future expansion of the DSP operational codes. If any new type of service is added in the future, the DSP operational codes and the RCF software may be upgraded with new software to accommodate the new requirement without immediately impacting the whole system.

The depicted board also includes distributing function unit (DFU) 116 and a shared input/output memory pool 156. Memory pool 156 may be implemented by a general purpose read/write memory. In one embodiment, memory pool 156 is a dual port RAM. In another embodiment, memory pool 156 is a dual port SRAM. Memory pool 156 is partitioned into eight memory sections S1A, S1B, S2A, S2B, S3A, S3B, S4A, S4B.

A memory address bus 157, shared between DFU 116 and processing bank 112, provides memory addressing to memory pool 156. In order to avoid contention between DFU 116 and processing bank 112 in accessing memory pool 156, coordination signals are implemented. In a preferred embodiment of the present invention, a single data bus, shared between DFU 116 and processing bank 112, provides read/write data access between memory pool 156, processing bank 112, and DFU 116. However, for purposes of illustrating the invention, the depicted embodiment includes a plurality of data buses coupling processors 130, 132, 134, 136 and DFU 116 to memory sections S1A, S1B, S2A, S2B, S3A, S3B, S4A, S4B as described further below.

In the depicted embodiment, processor 130 is coupled for bi-directional communication with memory section S1A, via a data bus 157, and with memory section S1B via a data bus 158. Processor 132 is coupled for bi-directional communication with memory section S2A, via a data bus 160, and with memory section S2B via a data bus 162. Processor 134 is coupled for bi-directional communication with memory section S3A, via a data bus 164, and with memory section S3B via a data bus 166. Processor 136 is coupled for bi-directional communication with memory section S4A, via a data bus 168, and with memory section S4B via a data bus 170.

Each of memory sections S1A, S1B, S2A, S2B, S3A, S3B, S4A, and S4B is coupled for bi-directional communication with a port of DFU 116 via one of bi-directional data buses 171. Each of memory sections S1A, S1B, S2A, S2B, S3A, S3B, S4A, and S4B is partitioned into memory portions including an input portion and an output portion (not shown). Each memory portion of memory pool 156 includes two ports. Each of the input portions includes a first port coupled to receive bit streams of raw data from a corresponding port of DFU 116 and a second port coupled to provide the bit streams of raw data to a corresponding processor of processing bank 112. Each output portion includes a first port coupled to receive bit streams of processed data from a processor of processing bank 112 and a second port coupled to provide the bit streams of processed data to a corresponding port of DFU 116. As described, DFU 116 is coupled for bi-directional multi-channel communication with line card 120 (FIG. 1) via back plane 102 (FIG. 1). So, specifically, DFU 116 provides multiplexed/demultiplexed paths between the channels and the memory sections of memory pool 156. In the depicted embodiment of the communications board 110, it is assumed that the bit stream speed is the same for every channel of data transmitted between DFU 116 and shared memory pool 156.

The partitioning of the shared memory pool 156 and multiplexing and demultiplexing of data packets between processing bank 112 and I/O bus 118 provides for a flexible input/output configuration for channels of data transmitted between processing bank 112 and I/O bus 118. This flexible input/output configuration allows for adapting the structure and function of the processing bank to implement various modes of processing including pipeline processing. As mentioned, each of the processors 130, 132, 134 136 may be serially linked in two directions by enabling serial ports 131, 133, and 135. For example, if serial port 131 is turned on, processors 130 and 132 form a combination which may operate in a pipeline mode.

The processing performance of the pipeline combination of the two processors 130, 132 may be varied by selecting the input to the pipeline combination from the input portions of sections S1A and S1B of the shared memory pool and by selecting the output portion of the pipeline combination from the output portions of sections S2A and S2B of the shared memory pool. As mentioned, resource controller 114 controls multiplexing/demultiplexing operations of DFU 116 to select appropriate sections S1A, S1B, S2A, S2B, S3A, S3B, S4A, S4B of memory pool 156 for input and output of data to and from selected processors of processing bank 112. For example, if the processing power of one processor is required, the input and output of the combination of processors 130 and 132 may be formed respectively at the input portion of section 1A and the output portion of the section 2A As another example, if the processing power of one and a half processors is required, an input to the combination of processors 130 and 132 may be formed respectively at the input portion of section 1A and at the output portion of section 2B.

The data flow between sections S1A, S1B, S2A, S2B, S3A, S3B, S4A, S4B of memory pool 156 actually flows via processors 130, 132, 134, 136 and serial ports 131, 133, 135. For example, if processor 130 is assigned to a call setup request that requires the whole processing power of one of the processors, the data input path to processor 130 can be set to the input portion of memory section S1A and the data output path from processor 130 can be set to the output portion of memory section S1B. The data flow between S1A and S1B is provided via processor 130. Specifically, DFU 116 provides data corresponding to the call setup request to the input portion of memory section S1A. Processor 130 then fetches the data from the input portion of memory section S1A through bus 157. Processor 130 then processes the input data. Upon completion of processing, processor 130 provides the processed data to the output portion of memory section S1B via the appropriate address bus and data bus. DFU 116 can then access the processed data from memory section S1B and route it into the proper channel of the T1/E1 facility for transmission. Each of the above described memory transactions for this example are coordinated by resource controller 114.

The tasks specified by the call setup requests require different software modules of the DSP operational codes in order to process data packets related to different services. Each of the processors 130, 132, 134, 136 provides processing of data using appropriate software modules of the DSP operational codes stored in the local memory units 138, 140, 142, 144. To manage the operations of each processor, the set of DSP operational codes stored in each local memory space 138, 140, 142, 144 implements a local resource control (LRC) table for managing processing operations of the corresponding processor.

The LRC table of each local memory space 138, 140, 142, 144 includes fields for storing data representative of information describing current processing operations of the corresponding processor. The LRC table provides mapping among software modules of the DSP operational codes and the functions required for processing tasks related to different types of services. Each processor releases its resources upon completion of processing of tasks required by a service call and waits for the next service call request to be received.

Figure 3:
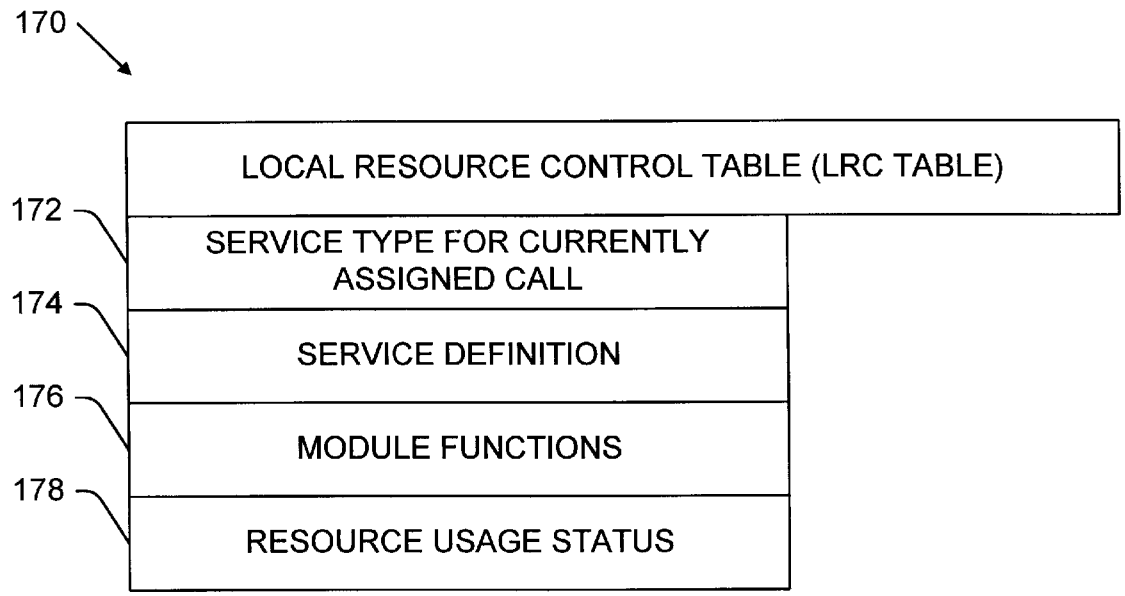
FIG. 3 is an illustration of a local resource control table for managing the resources of a single processor of a processing bank of the circuit of FIG. 2.

FIG. 3 illustrates an exemplary LRC table at 170 including a service type field 172, a service definition field 174, a module functions field 176, and a resource usage status field 178. Service type field 172 is used to store data representative of the service type of a service call currently assigned for processing by the processor corresponding to the LRC table.

Service definition field 174 is used to store information representative of all service types currently supported by the DSP operational code of the corresponding processor. Each processor of processing bank 112 (FIG. 2) provides this information to the resource controller 114. Call assignments are performed by the resource controller based on this information. If the service type requested by the end user is not supported by the DSP operational code, resource controller 114 rejects the call setup request of that service type.

Module functions field 176 is used to store data representative of the software modules of the DSP operational code required for processing tasks of the currently assigned service call. Resource usage status field 178 is used to store data representative of the status of the available processing power of the corresponding processor. Field 178 is updated each time the processor receives a new assigned call or completes an assigned call. The processor accepts or rejects call assignments based on the contents of field 178.

Figure 4:
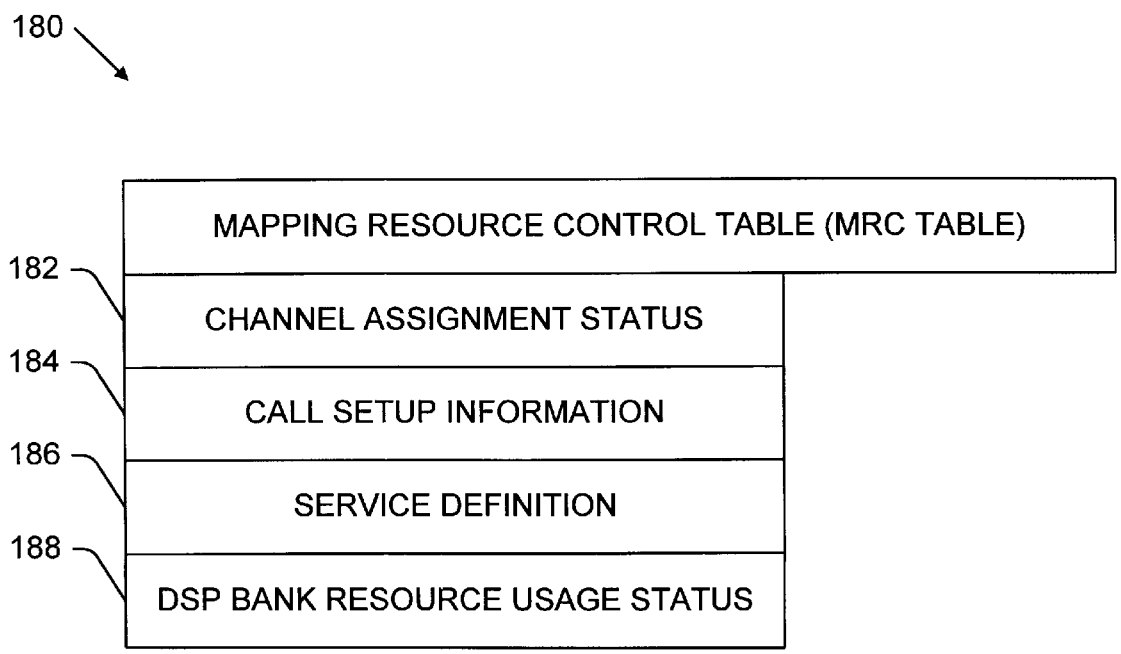
FIG. 4 is an illustration of a mapping resource control table for managing the resources of a plurality of processors of the processing bank of the circuit of FIG. 2.

FIG. 4 shows at 180 an exemplary mapping resource control (MRC) table 115. The depicted MRC table includes a channel assignment status field 182, a call setup information field 184, a service definition field 186, and a processing resource usage status field 188. Channel assignment status field 182 is used to store channel assignment information used by resource controller 114 to coordinate the data flow paths between the channels, assigned sections of memory pool 156 (FIG. 2), and assigned processors of processing bank 112. The channel assignment information indicates the service calls are assigned to each processor or processors of the processing bank.

Call setup information field 184 is used to store data representative of call setup information for each call. The resource controller uses this information to assign calls to processors of processing bank 112 (FIG. 2). This field also stores information necessary for the operation, administration, and maintenance functions of CPU 106 (FIG. 1).

Service definition field 186 is used to store data indicating all service types currently supported by the DSP operational codes of the processors of the processing bank 112 (FIG. 2). The service definition field 174 of the LRC table 170 is used to update service definition field 186 of the MRC table 180. The resource controller uses information stored in field 186 to accept or reject services requested by the end users. Processing bank resource usage status field 188 is used for storing data representative of the availability of each of the processors of the processing bank 112. Field 188 is updated by tracking the usage of the processors of the processing bank.

Upon completion of processing of tasks of a service call, the assigned processor or processors releases the resource, updates the resource usage status field 178 (FIG. 3), and reports to resource controller 114 which then updates its processing bank resource usage status field 188 to manage the processing resources of processing bank 112 (FIG. 2).

When the processing power of one processor is sufficient to meet the processing requirements of a service type, pipeline processing is not required and the resource controller 114 selects a single processor from processing bank 112 (FIG. 1) to be the assigned processor for that service type. When the processing power of one processor is not sufficient to meet the processing requirements of a service, resource controller 114 (FIG. 1) selects two or more of the processors 130, 132, 134, 136 or even one and half of the processors to be the assigned processor for that service type and the assigned processors operate in a pipeline mode.

In operation, referring back to FIG. 2, resource controller 114 activates appropriate modules of the DSP operational codes based on service call requirements by pointing to the proper position on the LRC table of selected processors(s). The controller then revises appropriate records of MRC table 115.

It is assumed that each of the processors 130, 132, 134, 136 provides adequate processing power for processing two channels of basic communication services. The definition of basic communication services depends on the type of communication system in which the communications board is used. It is also assumed in the embodiment that each of the processors 130, 132, 134, 136 provides adequate processing power for processing all known services of one channel at the time of system design. Therefore, it is assumed that the depicted communications board, having four processors, may simultaneously support eight basic service types of channels or four full service types of channels. As an example, the processing performance of a TIC548 digital signal processor is rated at 66 millions of instructions per second (66 MIPS) which is sufficient to support two channels for basic services operating at 4.8 Kbps, 9.6 Kbps, or 14.4 Kbps. The 66 MIPS processing power of a TIC548 digital signal processor is also sufficient to support one channel for full services operating at 4.8 Kbps, 9.6 Kbps, or 14.4 Kbps with extended facsimile transmission capability which requires handshaking signals.

Figure 5:
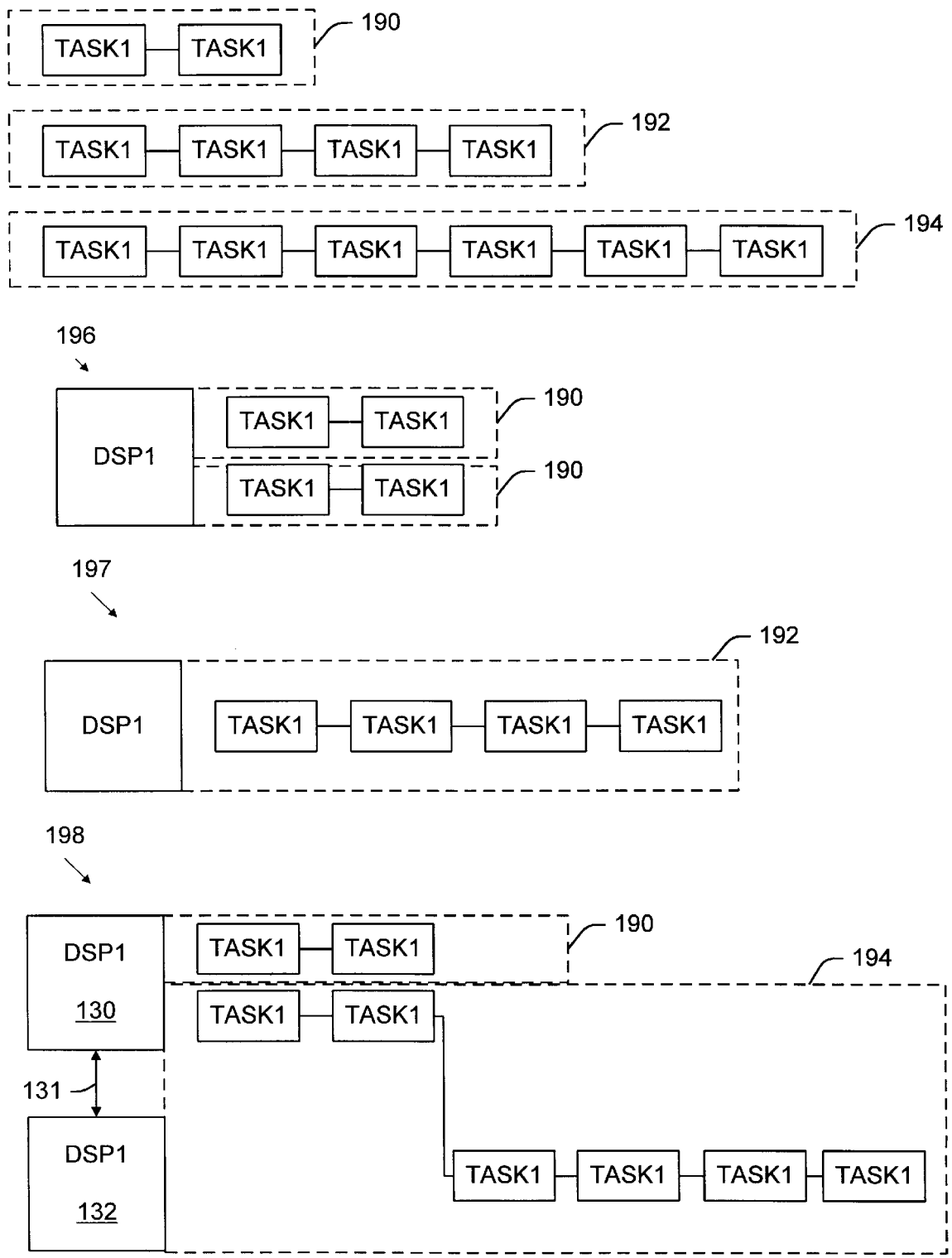
FIG. 5 illustrates three exemplary types of services which may be processed by the circuit of FIG. 2.

FIG. 5 illustrates three exemplary types of services. A first service type 190 is a basic service type and includes two tasks TASK1 and TASK2. A second service type 192 includes four tasks TASK1, TASK2, TASK3, TASK4 and is a full service type which may represent the most sophisticated service type known at the time of system design. A third service type 194 consists of six tasks TASK1, TASK2, TASK3, TASK4, TASK5, TASK6.

As illustrated at 196, it is assumed that a single processor of the processing bank, such as processor 130, can process two channel amounts of the first service type 190. As illustrated at 197, it is assumed that processor 130 can process one channel amount of the second service type 192. As new services are developed and implemented on the communications system, a single processor of the communication board 110 (FIG. 2) may not be able to process all the tasks required by service calls of the new services. It is assumed that the third service type 194 requires one and a half times the processing power of one of processors 130, 132, 134 136 (FIG. 2). Therefore, as illustrated at 198, processors 130 and 132, linked by serial port 131 to operate in a pipeline mode, can process one channel amount of the first service type 190 and one channel amount of the third service type 194.

Figure 6:
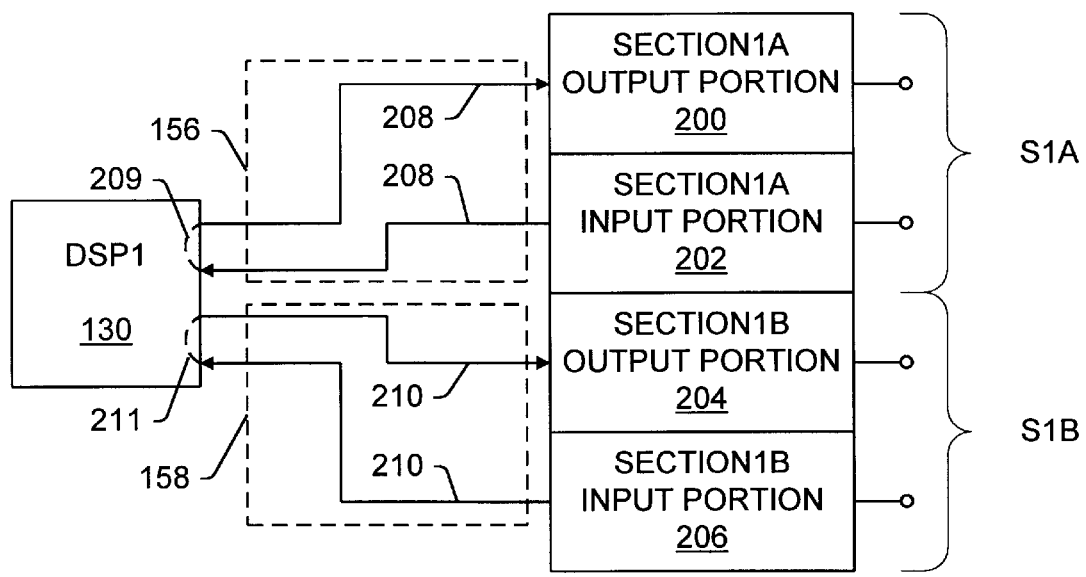
FIG. 6 illustrates a mode of operation for processing two channels of a basic service using the processing bank and a shared memory pool of the circuit of FIG. 2.
Figure 7:
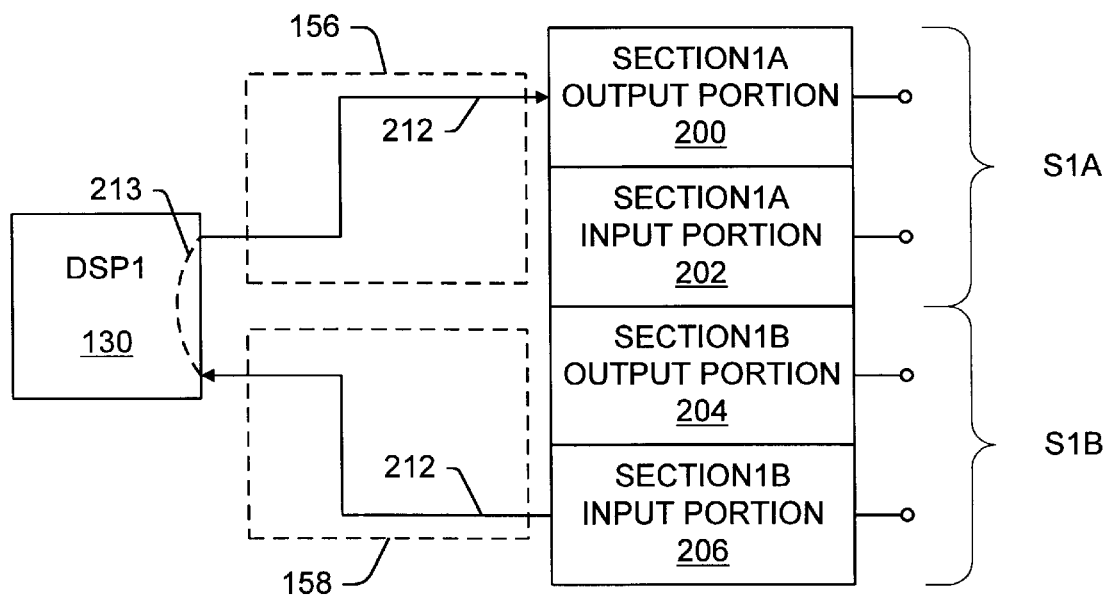
FIG. 7 illustrates a mode of operation for processing a single channel of a full service using the processing bank and shared memory pool of the circuit of FIG. 2.
Figure 8:
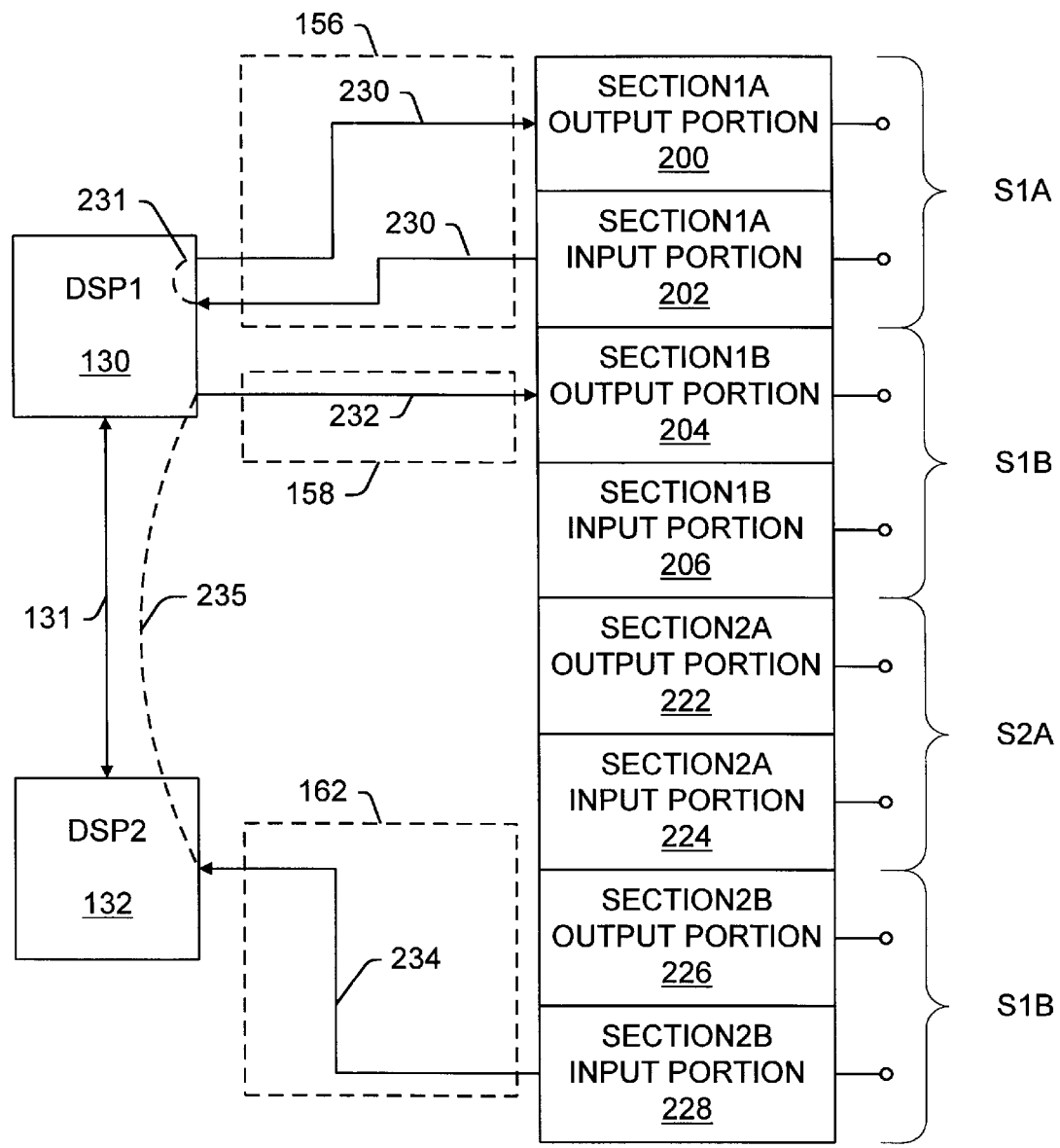
FIG. 8 illustrates a pipeline mode of operation for processing a single channel of a basic service using the processing bank and shared memory pool of the circuit of FIG. 2.

FIGS. 6, 7, and 8 illustrate various modes of operation of processing bank 112 (FIG. 2). FIG. 6 illustrates a mode of operation for processing two channels of a basic service such as the first service type 190 (FIG. 5). Processor 130 of processing bank 112 (FIG. 2) operates in conjunction with an output portion 200 of memory section S1A, an input portion 202 of memory section S1A, an output portion 204 of memory section S1B, and an input portion 206 of memory section S1B. A first data input/output path 208 for processing a first basic service channel is established to transmit raw data from input portion 202 of memory section S1A to processor 130 and to transmit processed data from processor 130 to output portion 200 of memory section S1A via bus 157. The dashed line at 209 inside processor 130 indicates a path through stages of processor 130 for the first input/output path 208. As mentioned, while memory pool 156 is partitioned into memory sections, data may flow from one memory section to another. Therefore, in first data input/output path 208, data flows from output portion 200 of memory section S1A to input portion 202 of memory section S1A. As described above, each input section and each output section of memory pool 156 (FIG. 2) includes a first port for connecting to a corresponding processor and a second port for connecting to a port of DFU 116 (FIG. 2).

A second data input/output path 210 for processing a second basic service channel is established to transmit raw data from input portion 206 of memory section S1B to processor 130 and to transmit processed data from processor 130 to output portion 204 of memory section S1B via bus 158. The dashed line at 211 inside processor 130 indicates a path through stages of processor 130 for the second input/output path 210. To complete second data input/output path 210, data flows from output portion 204 of memory section S1B to input portion 206 of memory section S1B.

FIG. 7 illustrates a mode of operation for processing a single channel of a full service type such as the second service type 192 (FIG. 5). Processor 130 of processing bank 112 (FIG. 1) operates in conjunction with output portion 200 of memory section S1A, an input portion 202 of memory section S1A, an output portion 204 of memory section S1B, and an input portion 206 of memory section S1B. An input/output data path 212 for processing a first basic service channel is established to transmit raw data from input portion 206 of memory section S1B to processor 130 via bus 158 and to transmit processed data from processor 130 to output portion 200 of memory section S1A via bus 157. The dashed line at 213 inside processor 130 indicates a path through stages of processor 130 for the input/output path 212. To complete data input/output path 212, data flows from output portion 200 of memory section S1A to input portion 206 of memory section S1B.

As discussed, the processing performance of a pipeline combination processors of processing bank 112 (FIG. 2) may be varied by selecting the input to the pipeline combination from the input portions of sections of the shared memory pool and by selecting the output portion of the pipeline combination from the output portions of sections of the shared memory pool. As mentioned, resource controller 114 (FIG. 2) controls multiplexing/demultiplexing operations of DFU 116 to select appropriate sections S1A, S1B, S2A, S2B, S3A, S3B, S4A, S4B of memory pool 156 for input and output of data to and from selected processors of processing bank 112.

FIG. 8 illustrates a pipeline mode of operation for processing a single channel of a basic service such as the second service type 190 (FIG. 5) in addition to a single channel of an extended service such as the third service type 194 (FIG. 5). Processors 130 and 132 of processing bank 112 (FIG. 1) are serially coupled via serial port 131 to operate in a pipeline mode in conjunction with output portion 200 of memory section S1A, input portion 202 of memory section S1A, output portion 204 of memory section S1B, input portion 206 of memory section S1B, output portion 222 of memory section S2A, input portion 224 of memory section S2A, output portion 226 of memory section S2B, and input portion 228 of memory section S2B.

An input/output path 230 for processing a basic service channel is established to transmit raw data from input portion 202 of memory section S1A to processor 130 and to transmit processed data from processor 130 to output portion 200 of memory section S1A via bus 157. The dashed line at 231 inside processor 130 indicates a path through stages of processor 130 for the input/output path 230. To complete data input/output path 230, data flows from output portion 200 of memory section S1A to input portion 206 of memory section S1B.

An input/output path 232 for processing an extended service channel is established to transmit raw data from input portion 228 of memory section S2B to processor 132 via bus 162 and to transmit processed data from processor 132 to output portion 204 of memory section S1B via bus 158. The dashed line at 235 inside processor 132 indicates a path through stages of processor 132 for the input/output path 232. To complete data input/output path 232, data flows from output portion 204 of memory section S1B to input portion 228 of memory section S1B.

Figure 9:
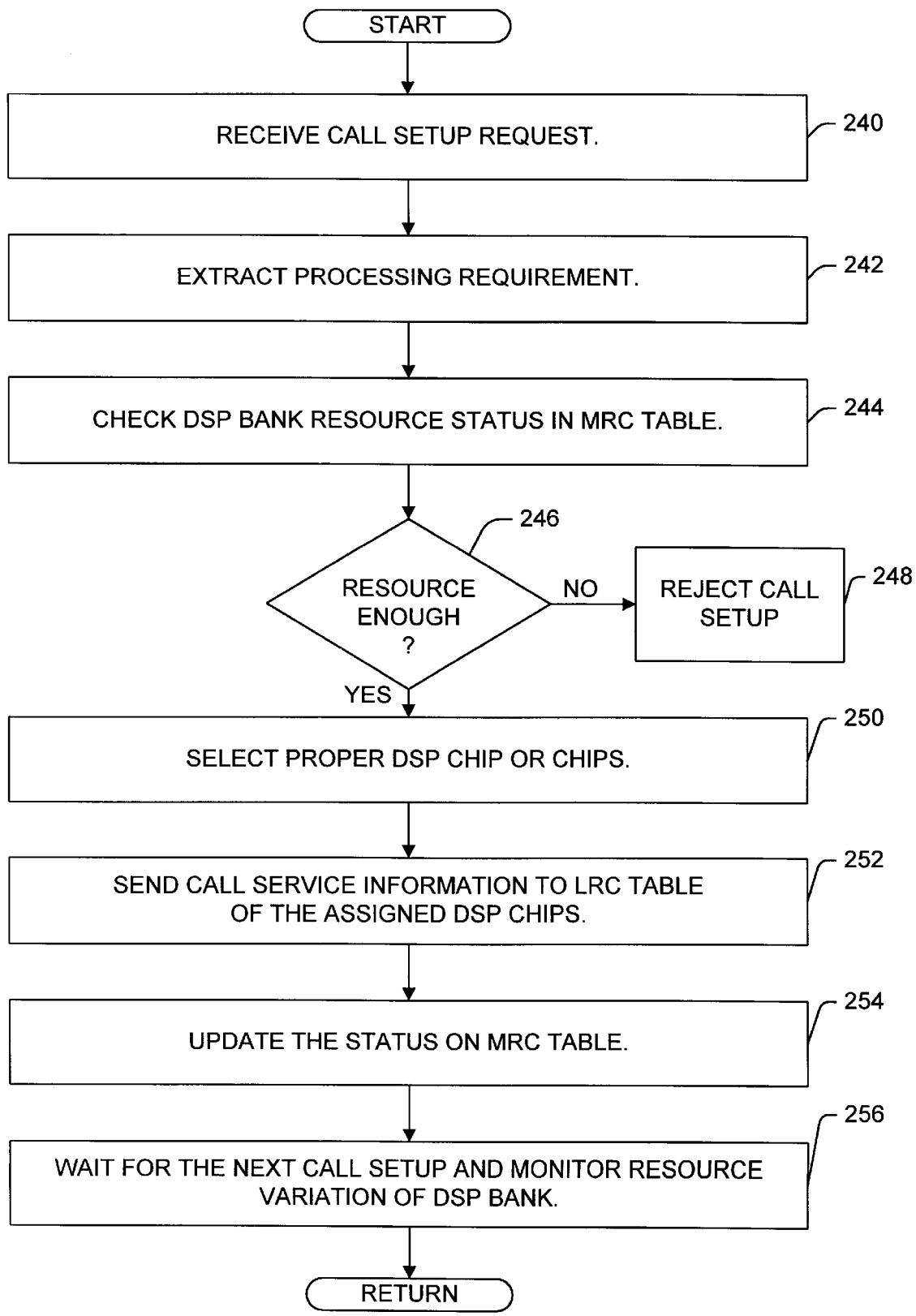
FIG. 9 shows a flow diagram illustrating a process for dynamic allocation of processing resources implemented by a resource controller according to the present invention.

FIG. 9 shows a flow diagram at 900 illustrating a processing resource management process implemented by resource controller 114 (FIG. 2) according to the present invention. In step 240, resource controller 114 receives a call setup request via distributing function unit 116 (FIG. 2). In step 242, the resource controller extracts the processing power requirement carried within the call setup message. In step 244, the resource controller reads the processing bank resource usage status field 188 (FIG. 4) of the MRC table at 180 (FIG. 4) to determine the amount of processing power currently available in processing bank 112 (FIG. 2).

In step 246, the resource controller determines whether the processing power currently available in the processing bank is sufficient for servicing the incoming service call. Provided that the currently available processing power is not sufficient for servicing the incoming call, processing proceeds to step 248 in which the controller rejects the call setup request. Provided that the currently available processing power is sufficient for servicing the incoming call setup request, processing proceeds to step 250 in which the controller selects the proper processor or plurality of processors from processing bank 112 (FIG. 2) to service the incoming service call. As described above, the resource controller may determine that the processing power of a single processor is not sufficient to process the tasks required by an incoming call setup request. So, the controller may enable one or more of serial ports 131, 133, 135 (FIG. 2) of processing bank 112 (FIG. 2) to activate a pipeline mode of processing. As also explained, the processing performance of a pipeline combination of processors may be varied by selecting appropriate sections S1A, S1B, S2A, S2B, S3A, S3B, S4A, S4B of memory pool 156 (FIG. 2) for input and output of data to and from selected processors of processing bank 112.

From step 250, processing proceeds to step 252 in which the resource controller sends call service information to the LRC table at 170 (FIG. 3) of the processor or processors elected in step 250. The resource controller activates appropriate modules of the DSP operational code set based on service types by pointing to the proper position in the LRC table corresponding to the elected processor(s).

In step 254, the resource controller updates the status of the MRC table at 180 (FIG. 3) by, for example, revising the status of the channel assignment status field 182 and processing bank resource status field 188 to indicate that data packets received via channels corresponding to the current call setup request have been assigned for processing by the elected processor(s).

In step 256, the resource controller 114 waits for the next call setup and monitors the resource variation of the processing bank 112 (FIG. 2) as processors 130, 132, 134, 136 complete processing tasks requested by call setup requests.

Figure 10:
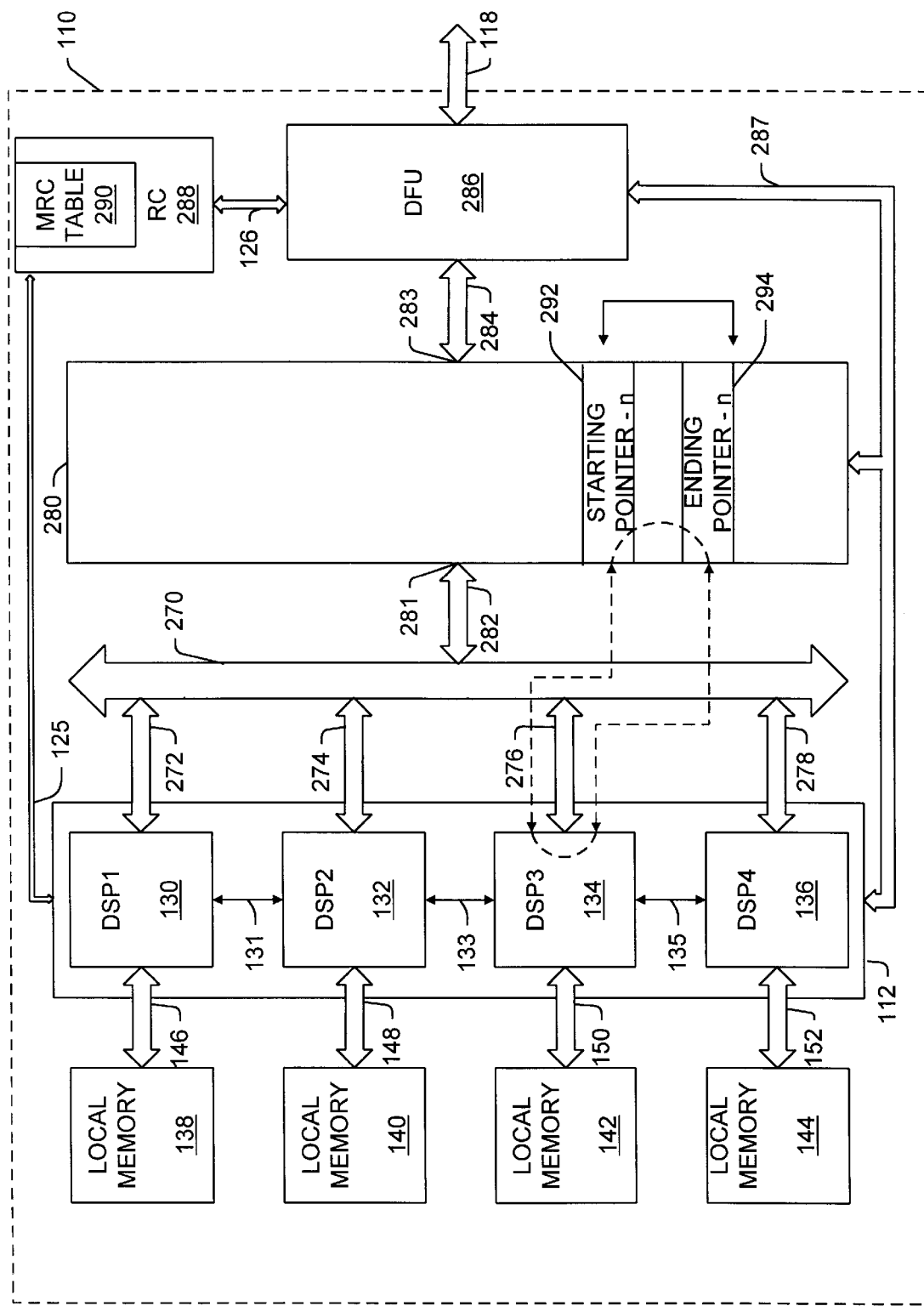
FIG. 10 is a detailed block diagram of an alternative embodiment of the communications board for use in a packet-switched data service in which the data services use frame relay as the underlying protocol.

FIG. 10 is a detailed block diagram of an alternative embodiment of the communications board 110 (FIG. 1) for use in a packet-switched data system in which the data services use frame relay as an underlying protocol. In a Code-Division Multiplexing-Access (CDMA) system, for example, data services employ frame relay as an underlying protocol. CDMA systems use a channel concept which is described in terms of virtual circuits. The bit stream speeds of channels for different virtual circuits may vary in CDMA systems. For example, the bit stream speed for a channel in a CDMA system may be 64 Kbps, or may be a multiple of 64 Kbps. In other word, each virtual circuit may occupy a bandwidth which is a multiple of 64 Kbps on a T1/E1 facility.

For use in a packet switched CDMA system, modifications are made to the communications board 110 specified in the first embodiment of the communications system, described in reference to FIG. 2, which is designed specifically for use in a circuit-switched type data service in which the bit stream speed is approximately equal for a multiplicity of channels. The depicted communications board 110 for use in a packet switched system includes the processing bank 112 and the local memory spaces 138, 140, 142, 144. The depicted communications board 110 further includes a common bus 270 which is respectively coupled for bi-directional communication with processors 130, 132, 134, 136 via buses 272, 274, 276, 278.

Because bit stream speeds of channels for different virtual circuits may vary in packet switched systems, the minimum amount of memory which must be allocated for use in processing data received via a channel will vary with the bit stream speed of the channel. Therefore, the size of the memory section required to be allocated for each processor in a shared memory pool may vary if the bit stream speed differs significantly for different virtual circuits. Therefore, additional control logic is required for memory allocation in the shared memory pool in a circuit of the present invention for use in a packet switched CDMA system.

A memory pool 280 includes a first port 281, coupled to the common bus 270 via a bus 282, and a second port 283 coupled to a distributing function unit 286 via a bus 283. The common bus 270 allows each of processors 130, 132, 134, 136 to access any part of the shared memory pool 280. A distributing function unit (DFU) 286 is configured to allocate different amounts of memory for different virtual circuits operating at different bit stream speeds. An address bus 287, shared by DFU 286 and processing bank 112, provides memory addressing to memory pool 280. In order to avoid contention between DFU 286 and processing bank 112 in accessing memory pool 280, coordination signals or logic circuits may be implemented as is well known in the art The depicted communications board 110, designed for use in packet switched systems, includes a resource controller 288 capable of generating address pointers defining specific amounts of memory space to be allocated in memory pool 280 for each virtual circuit. A mapping resource control table (MRC table) 290 includes fields for storing data representing the address pointers. In the preferred embodiment, resource controller 288 receives the call setup requests from CPU 106 (FIG. 1) via back plane 102, bus 118, DFU 288, and bus 126. From channel setup information of the call setup request, resource controller 114 extracts virtual circuit information including the amount of memory required for each virtual circuit Based on the amount of memory space required, resource controller 288 generates a starting address pointer 292 and an ending address pointer 294 to represent a starting address and ending address in the shared memory pool 280 defining the proper amount of memory to be allocated for each virtual circuit connection.

The MRC table 290 can then pass starting and ending address pointers 292 and 294 to the LRC table in local memory space 138, 140, 142, 144 of the assigned processor(s) 130, 132, 134, 136. The assigned processor can then access the proper address of memory pool 280 using the pointers 292 and 294. Because the allocation of memory is performed using starting and ending address pointers, resource controller 288 can control DFU 286 to address any part of the available memory in memory pool 280. In alternative embodiments, allocation of memory may be performed using other appropriate address parameters such as, for example, a starting address and an address length.

Because the pointers change when different virtual circuits are set up, resource controller 288 is required to manage the memory usage to avoid memory fragmentation. Upon completion of all tasks related to a service carried by one virtual circuit, resource controller 288 control DFU 286 to release the part of memory pool 280 to become available for other virtual circuits.

In the depicted communications board 110, a virtual circuit n is assigned to processor 134 with a memory section allocated in the memory pool 280 and defined by starting and ending address pointers 292 and 294. The resource control functions for dynamic allocation of processing power of processing bank 112 provided by resource controller 288 are the same as described above in relation to the first embodiment of the present invention.

In addition to the addressing flexibility, common bus 270 also provides a high-speed I/O capability in case the virtual circuit bit stream speed exceeds the communication capability of the serial ports 131, 133, 135 which have a data transmission speed limitation ranging from 25% of the clock rate of processors 130, 132, 134, 136 up to 100% of the clock rate of the processors because the flow of data to a processor via a serial port is interrupt driven. In a frame relay type application, the data transmission speed can be up to several H channel capacity wherein one H channel may have a data transmission speed as high as 384 Kbps. Therefore, in a frame relay type application, the interrupt frequency generated by a serial port can be very high. If the processors are required to serve the serial port interrupt too often, the processing efficiency of the processors will be diminished. The common bus 270 provides a parallel data fetch path between the processing bank 112 and memory pool 280. Each processor can access memory pool 280 using an address specified by starting and ending pointers 292. 294 received from resource controller 114. For example, processor 130 may share processing power by providing the partially processed data back to the memory pool 280 via common bus 270 and processor 132 may fetch the partially processed data via the common bus to continue the processing. This setup avoids the use of a serial port while providing pipeline processing capability.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What I claim is:

1. A communications circuit for use in a data system providing communication services between system nodes including an information handling center and multiple equipped user terminals, said system including a plurality of communication lines each having a plurality of channels for transmitting bit streams including service data packets and corresponding call setup requests indicative of a required amount of digital signal processing for said service data packets, said circuit comprising:
   a dual port memory pool;
   a distributing function unit coupled for bi-directional communication with said system nodes via said channels;
   a processing bank including a plurality of digital signal processors selectively connectable in series via serial ports to selectively operate in a plurality of modes including pipeline modes;
   a bi-directional data bus means for communicating data between each of said processors and said memory pool and for communicating data between said distributing function unit and said memory pool, said distributing function unit providing multiplexed/demultiplexed data paths between said channels and said memory pool;
   an address bus means for communicating address information between each of said processors and said memory pool and for communicating address information between said distributing function unit and said memory pool; and
   a resource controller, coupled to said distributing function unit and to said processing bank, said controller implementing resource control functions for dynamically allocating resources of said processing bank, said functions including,
   controlling said distributing function unit, based on said call setup requests, to control said multiplexed/demultiplexed paths between said channels and said memory pool,
   selecting from said processors, based on said call setup requests, for processing said tasks, and
   selecting said serial ports, based on said call setup requests, to selectively provide pipeline processing between said processors for processing said tasks.

2. A communications circuit as recited in claim 1 wherein said data system is a circuit-switched data system in which the bit stream speed is substantially equal for each of said channels and wherein said memory pool is partitioned into discrete memory sections respectively corresponding to said processors said memory sections being partitioned into memory portions including an input portion and an output portion.

3. A communications circuit as recited in claim 2 wherein said circuit-switched data system is a Global System for Mobile Communications data system.

4. A communications circuit as recited in claim 1 wherein said data system is a packet-switched data system in which frame relay is used as an underlying protocol, wherein said channels are described in terms of virtual circuits, wherein said corresponding call setup requests include channel setup information indicative of an amount of memory required for each said virtual circuit, and wherein said resource control functions provided by said resource controller further include:
   generating address parameters, based on said channel setup information, to define memory spaces in said memory pool for each of said virtual circuits, and
   providing said address parameters to said distributing function unit and to said local memory units associated with each of said processors, wherein said distributing function unit and said processors access said memory spaces in said memory pool using said address parameters.

5. A communications circuit as recited in claim 4 wherein said packet-switched data system is a Code-Division Multiplexing-Access system.

6. A communications circuit as recited in claim 1 wherein said resource controller includes a mapping resource control (MRC) table for managing dynamic allocation of resources of each of said processors of said processing bank, said MRC table including:
   a channel assignment status field for storing data indicating which of said call setup requests are assigned to said processors of said processing bank by said resource controller;
   a call setup information field for storing call setup information corresponding to each of said call setup requests;
   a service definition field for storing data indicating all service types currently supported by operational codes associated with said processors of said processing bank, wherein said resource controller uses said service definition field to decide whether to accept or reject said call setup requests; and a processing bank resource status field for storing updated information regarding the availability of each of said processors for processing tasks.

7. A communications circuit as recited in claim 1 further including a plurality of local memory units each connected to a corresponding one of said processors, each said memory unit for storing a set of operational codes defining modules for operating said corresponding processor.

8. A communications circuit as recited in claim 7 further including local resource control tables, implemented by each of said sets of operational codes, for managing operations of said corresponding processors, said local resource control tables providing mapping among said modules and said call setup requests assigned to said corresponding processors.

9. A communications circuit as recited in claim 8 wherein said resource controller activates said modules associated with said corresponding processor based on said call setup requests by pointing to positions on said local resource control tables.

10. A communications circuit as recited in claim 8 wherein said local resource control table includes:

a service type field for storing data representing types of services indicated by those of said call setup requests assigned to said corresponding processor;

a service definition field for storing data representing all service types currently supported by said sets of operational code stored in said local memory units;

a module functions field for storing data representing those of said modules required for processing tasks associated with said call setup requests assigned to said corresponding processor; and a resource usage status field for storing data indicating the amount of processing power currently available in said corresponding processor.

11. A communications circuit as recited in claim 1 wherein upon determining that the processing performance of a single one of said processors is sufficient to handle said required amount of digital signal processing indicated by said call setup request, said resource controller selects a single processor from said processing bank.

12. A communications circuit as recited in claim 1 wherein upon determining that said processing power of one of said processors is insufficient to handle said required amount of digital signal processing indicated by said call setup request, said resource controller selects at least two of said processors and forms a pipeline processing combination by enabling at least one of said serial ports to couple said at least two selected processors in series.

13. A communications circuit for use in a circuit-switched data system providing communication services between system nodes including an information handling center and multiple equipped user terminals, said system including a plurality of communication lines each having a plurality of channels for transmitting bit streams including service data packets and corresponding call setup requests indicative of a required amount of digital signal processing for said service data packets, wherein the bit stream speed is substantially equal for each of said channels, said circuit comprising:

a dual port memory pool partitioned into a plurality of discrete memory sections respectively corresponding to said processors;

a distributing function unit providing multiplexed/demultiplexed data paths between said channels and said memory portions of said memory pool;

a processing bank including a plurality of digital signal processors selectively connectable in series via serial ports to selectively operate in a plurality of modes including pipeline modes;

a bi-directional data bus means for communicating data between each of said processors and said corresponding sections of said memory pool and for communicating data between said distributing function unit and said sections of said memory pool, said distributing function unit providing multiplexed/demultiplexed data paths between said channels and said sections of said memory pool;

an address bus means for communicating address information between each of said processors and said memory pool and for communicating address information between said distributing function unit and said memory pool;

a resource controller, coupled to said distributing function unit and to said processing bank, said controller implementing resource control functions, based on said call setup requests, for dynamically allocating resources of said processing bank based on said call setup requests, said functions including, controlling said distributing function unit to determine said multiplexed/demultiplexed paths between said channels and said memory sections of memory pool, selecting from said processors for processing said tasks, and selecting said serial ports to selectively provide pipeline processing between said processors for processing said tasks.

14. A communications circuit as recited in claim 13 wherein said resource controller includes a mapping resource control (MRC) table for managing dynamic allocation of resources of each of said processors of said processing bank, said MRC table including:

a channel assignment status field for storing data indicating which of said call setup requests are assigned to said processors of said processing bank by said resource controller;

a call setup information field for storing call setup information corresponding to each of said call setup requests;

a service definition field for storing data indicating all service types currently supported by operational codes associated with said processors of said processing bank, wherein said resource controller uses said service definition field to decide whether to accept or reject said call setup requests; and a processing bank resource status field for storing updated information regarding the availability of each of said processors for processing tasks.

15. A communications circuit as recited in claim 13 further including a plurality of local memory units each connected to a corresponding one of said processors, each memory unit for storing a set of operational codes defining modules for operating said corresponding processor.

16. A communications circuit as recited in claim 15 further including local resource control tables, implemented by each of said sets of operational codes, for managing operations of said corresponding processors, said local resource control tables providing mapping among said modules and said call setup requests assigned to said corresponding processors.

17. A communications circuit as recited in claim 16 wherein said resource controller activates said modules associated with said corresponding processors based on said call setup requests by pointing to positions on said local resource control tables.

18. A communications circuit as recited in claim 16 wherein said local resource control table includes:
   a service type field for storing data representing types of services indicated by those of said call setup requests assigned to said corresponding processor;
   a service definition field for storing data representing all service types currently supported by said sets of operational code stored in said local memory units;
   a module functions field for storing data representing those of said modules required for processing tasks associated with said call setup requests assigned to said corresponding processor; and
   a resource usage status field for storing data indicating the amount of processing power currently available in said corresponding processor.

19. A communications circuit for use in a packet-switched data system in which frame relay is used as an underlying protocol, said system providing communication services between an information handling center and multiple equipped user terminals, said system including a plurality of communication lines each having a plurality of channels for transmitting bit streams, said channels being described in terms of virtual circuits, said bit streams including service data packets, corresponding call setup requests indicative of a required amount of digital signal processing for said corresponding data packets, and channel setup information indicative of an amount of memory required for each said virtual circuit, said communications circuit comprising:
   a dual port memory pool;
   a distributing function unit providing multiplexed/demultiplexed paths between said channels and said memory pool;
   a processing bank including a plurality of digital signal processors selectively connectable in series via serial ports to selectively operate in a plurality of modes including pipeline modes;
   a bi-directional data bus means for communicating data between each of said processors and said memory pool and for communicating data between said distributing function unit and said memory pool, said distributing function unit providing multiplexed/demultiplexed data paths between said channels and said memory pool;
   an address bus means for communicating address information between each of said processors and said memory pool and for communicating address information between said distributing function unit and said memory pool;
   a plurality of local memory units each connected to a corresponding one of said processors for storing digital signal processing operational codes defining modules for operating said corresponding processors;
   a resource controller, coupled to said distributing function unit and to said processing bank, said controller providing resource control functions for dynamically allocating resources of said processing bank, said functions including,
   generating address parameters, based on said channel setup information, defining a memory space in said memory pool for each said virtual circuit,
   providing said address parameters to said distributing function unit and to said local memory units,
   providing control signals to said distributing function unit to control multiplexed/demultiplexed paths between said channels and said memory pool, and
   providing control signals to said processing bank to select at least one of said processors, based on said required amounts of digital signal processing indicated by said call setup requests, for processing tasks related to said call setup requests and to selectively enable said serial ports to selectively provide pipeline processing between said processors wherein said selected processors access said memory pool using said address parameters.

20. A communications circuit as recited in claim 19 wherein said address parameters include starting and ending pointers representing starting and ending addresses in said memory pool.

21. A communications circuit as recited in claim 19 wherein said packet-switched data system is a Code-Division Multiplexing-Access system.

22. A communications circuit as recited in claim 19 wherein the bit stream speed for each said channel is a multiple of 64 Kbps.

23. A communications circuit as recited in claim 19 wherein said resource controller includes a mapping resource control (MRC) table for managing dynamic allocation of resources of each of said processors of said processing bank, said MRC table including:
   a channel assignment status field for storing data indicating which of said call setup requests are assigned to said processors of said processing bank by said resource controllers;
   a call setup information field for storing call setup information corresponding to each of said call setup requests;
   a service definition field for storing data indicating all service types currently supported by operational codes associated with said processors of said processing bank, wherein said resource controller uses said service definition field to decide whether to accept or reject said call setup requests; and
   a processing bank resource status field for storing updated information regarding the availability of each of said processors for processing tasks.

24. A communications circuit as recited in claim 19 further including a plurality of local memory units each connected to a corresponding one of said processors, each memory unit for storing a set of operational codes defining modules for operating said corresponding processor.

25. A communications circuit as recited in claim 24 further including local resource control tables, implemented by each of said sets of operational codes, for managing operations of said corresponding processors, said local resource control tables providing mapping among said modules and said call setup requests assigned to said corresponding processors.

26. A communications circuit as recited in claim 25 wherein said resource controller activates said modules based on said call setup requests by pointing to a position on said local resource control table.

27. A communications circuit as recited in claim 25 wherein said local resource control table includes:
   a service type field for storing data representing types of services indicated by those of said call setup requests assigned to said corresponding processor;
   a service definition field for storing data representing all service types currently supported by said sets of operational code stored in said local memory units;

a module functions field for storing data representing those of said modules required for processing tasks associated with said call setup requests assigned to said corresponding processor; and a resource usage status field for storing data indicating the amount of processing power currently available in said corresponding processor.

\* \* \* \* \*